United States Patent
Prasad et al.

(10) Patent No.: US 11,360,993 B1
(45) Date of Patent: Jun. 14, 2022

(54) AUTOMATIC GENERATION OF SPECIFICATIONS FOR DATA ACCESS LAYER APPLICATION PROGRAMMING INTERFACES

(71) Applicant: FMR LLC, Boston, MA (US)

(72) Inventors: Vinay Kumar Prasad, Bangalore (IN); David Bonaccorsi, Warwick, RI (US); David Brett, Warwick, RI (US); Pranay Gupta, Mansfield, MA (US); Ramnik Mayor, South Grafton, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/175,212

(22) Filed: Feb. 12, 2021

(51) Int. Cl.
| | |
|---|---|
| G06F 17/30 | (2006.01) |
| G06F 16/25 | (2019.01) |
| G06F 16/28 | (2019.01) |
| G06F 16/22 | (2019.01) |
| G06F 9/54 | (2006.01) |
| G06F 16/23 | (2019.01) |
| G06F 16/955 | (2019.01) |

(52) U.S. Cl.
CPC ............ *G06F 16/252* (2019.01); *G06F 9/541* (2013.01); *G06F 16/2282* (2019.01); *G06F 16/2358* (2019.01); *G06F 16/2365* (2019.01); *G06F 16/254* (2019.01); *G06F 16/284* (2019.01); *G06F 16/955* (2019.01)

(58) Field of Classification Search
CPC .......... G06F 16/13; G06F 16/21; G06F 16/24; G06F 16/156; G06N 3/00; G06N 5/00; G05B 13/00
See application file for complete search history.

(56) References Cited

U.S. PATENT DOCUMENTS 10,803,029 B2   10/2020  Holm et al.
11,150,874 B2 * 10/2021  Lester .................. G06F 16/903
(Continued)

OTHER PUBLICATIONS

Pollet, Thomas, "Automatically Generate OpenAPI Specifications & Documentation with Python | Swagger Spotlight," posted Apr. 13, 2018, available at https://swagger.io/blog/api-development/automatically-generating-swagger-specifications-wi/, 3 pages.

*Primary Examiner* — Hung D Le
(74) *Attorney, Agent, or Firm* — Proskauer Rose LLP

(57) ABSTRACT

Methods and apparatuses are described for automatic generation of specifications for data access layer application programming interfaces (APIs). A server identifies an object-oriented data model comprising (i) a plurality of object structures containing one or more data elements and (ii) one or more relationships between at least two of the object structures. The server generates an API specification package using the object-oriented data model by identifying object structures to include in the API specification package, defining attributes for the API specification package, assigning data access operations to each identified object structure, creating data relationships between at least two of the identified object structures, and converting the identified object structures, the defined attributes for the API specification package, the assigned data access operations, and the created data relationships into one or more files that comprise the API specification package.

22 Claims, 11 Drawing Sheets

(56) References Cited

U.S. PATENT DOCUMENTS

| | | | |
|---|---|---|---|
| 2018/0196643 A1* | 7/2018 | Dolby | H04L 67/025 |
| 2018/0357154 A1* | 12/2018 | Dolby | G06F 11/3664 |
| 2019/0196811 A1* | 6/2019 | Bahrami | G06F 8/10 |
| 2019/0332357 A1 | 10/2019 | Reddy | |
| 2019/0354414 A1* | 11/2019 | Bailey | G06F 9/54 |
| 2020/0133751 A1* | 4/2020 | Bahrami | G06F 9/54 |
| 2020/0274900 A1 | 8/2020 | Vaishnavi | |
| 2020/0364033 A1* | 11/2020 | Lester | G06F 16/9027 |
| 2020/0364044 A1* | 11/2020 | Bahrami | G06F 8/73 |
| 2021/0006496 A1* | 1/2021 | Xiong | H04L 67/02 |
| 2021/0064453 A1* | 3/2021 | Bahrami | G06N 3/0445 |

\* cited by examiner

*Exemplary Logical Data Model*

Exemplary Physical Data Model

300

Exemplary Object Data Model

| | Name | Comme... | Collect... | DBSch... | pathN... | path_... | alias | A... | connect... | ... | pathAs... | pathFor... | tags | T... | t... | t... | toPersi... |
|---|---|---|---|---|---|---|---|---|---|---|---|---|---|---|---|---|---|
| | | ☑ | | | | | | | | | | | | ☐ | ☐ | ☐ | C,R,U |
| 2 | Comments | | 1 | | | answer | | | ☑ | ☑ | | | | ☐ | ☐ | ☐ | C,R,U |
| 3 | Posts | | 1 | | | comment | | | ☑ | ☑ | | | | ☐ | ☐ | ☐ | R |
| 4 | Questions | | 1 | | | posts | | | ☑ | ☑ | | | | ☐ | ☐ | ☐ | C,R,S,U |
| 5 | Tags | | 1 | | | questions | | | ☑ | ☑ | | | | ☐ | ☐ | ☐ | R,U,D |
| 6 | TagsMap | | 1 | | | tags | | | ☑ | ☑ | | | | ☐ | ☐ | ☐ | <None> |
| 7 | User | | | | | tagsmap | | | ☑ | ☐ | | | | ☐ | ☐ | ☐ | R,U,D |
| | | | | | | user | | | | | | | | | | | |

FIG. 9

List of Associations

| Name | Class A | | Class B | | Role A | Role B | Multipl. | Multipl. | Role A | Role B | | | pstCon |
|---|---|---|---|---|---|---|---|---|---|---|---|---|---|
| 1 | User | | Questions | | | questions | 1..1 | 0..* | | 20 | ☑ | ☑ | |
| 2 | Relationship_Questions | | Answers | | | Answers | 1..1 | 0..* | | 10 | ☑ | ☐ | |
| 3 | Relationship | User | | Answers | | | 1..1 | 0..* | | | ☐ | ☐ | |
| 4 | Relationship | Answers | | Comments | | | 1..1 | 0..* | | 5 | ☑ | ☑ | |
| 5 | Relationship | User | | Comments | | user | 1..1 | 0..* | | | ☐ | ☑ | |
| 6 | Relationship | User | | Points | | | 0..1 | 0..* | | | ☑ | ☑ | |
| 7 | Relationship | Answers | | Points | | | 0..1 | | | | ☑ | ☐ | |
| 8 | TagsMap | Questions | | Tags | | Relationship_4 | Relations | 0..* | | | ☐ | ☐ | |

FIG. 10

| # | Name | Data Ty... | ... | Classifier | ... | F... | Comme... | ... | ... | ... | external | ... | F... | ... | ... |
|---|------|-----------|-----|------------|-----|------|----------|-----|-----|-----|----------|-----|------|-----|-----|
| 1 | AnswerID | string | ☒ | Answers | | ☐ | | ☐ | ☒ | ☐ | | ☐ | ☒ | ☐ | ☐ |
| 2 | answerText | string | ☐ | Answers | | ☐ | | ☐ | ☒ | ☐ | | ☐ | ☒ | ☐ | ☐ |
| 3 | datetime | string | ☐ | Answers | | ☐ | | ☐ | ☒ | ☐ | | ☐ | ☐ | ☐ | ☐ |
| 4 | Comment | string | ☐ | Comments | | ☐ | | ☐ | ☒ | ☐ | | ☐ | ☒ | ☐ | ☐ |
| 5 | datetime | string | ☐ | Comments | | ☐ | | ☐ | ☒ | ☐ | | ☐ | ☒ | ☐ | ☐ |
| 6 | PointsEarned | number | ☒ | Points | | ☐ | | ☐ | ☒ | ☐ | | ☐ | ☒ | ☐ | ☐ |
| 7 | questionID | string | ☐ | Questions | | ☐ | | ☐ | ☒ | ☐ | | ☐ | ☒ | ☐ | ☐ |
| 8 | QuestionText | string | ☒ | Questions | | ☐ | | ☐ | ☒ | ☐ | | ☐ | ☒ | ☐ | ☐ |
| 9 | description | string | ☐ | Tags | | ☐ | | ☐ | ☒ | ☐ | | ☐ | ☒ | ☐ | ☐ |
| 10 | Keyword | string | ☐ | Tags | | ☐ | | ☐ | ☒ | ☐ | | ☐ | ☒ | ☐ | ☐ |
| 11 | topic | string | ☐ | TagsMap | | ☐ | | ☐ | ☒ | ☐ | | ☐ | ☒ | ☐ | ☐ |
| 12 | Badge | string | ☐ | User | | ☐ | | ☐ | ☒ | ☐ | | ☐ | ☒ | ☐ | ☐ |
| 13 | loginID | string | ☐ | User | | ☐ | | ☐ | ☒ | ☐ | | ☐ | ☒ | ☐ | ☐ |
| 14 | Name | string | ☒ | User | | ☐ | | ☐ | ☒ | ☐ | | ☐ | ☒ | ☐ | ☐ |
| 15 | UserID | string | ☐ | User | | ☐ | | ☐ | ☒ | ☐ | | ☐ | ☐ | ☐ | ☐ |

List of Attributes

AUTOMATIC GENERATION OF SPECIFICATIONS FOR DATA ACCESS LAYER APPLICATION PROGRAMMING INTERFACES

TECHNICAL FIELD

This application relates generally to methods and apparatuses, including computer program products, for automatic generation of specifications for data access layer application programming interfaces (APIs).

BACKGROUND

Most medium and large enterprise computing environments rely on a wide variety of application programming interfaces (APIs), such as Representational State Transfer (REST) APIs, to enable disparate computing systems to communicate with each other for the purposes of enabling robust software applications and functionality. For example, many production systems utilize data APIs residing on a data access layer (DAL), comprised of computing devices that utilize the APIs as an interface between application servers and databases (e.g., DB2, Oracle, NoSQL, VSAM) in order to store and retrieve data from the databases for use by software applications executing on the application servers. Frequently, the operations of such data APIs can comprise Create, Read, Update, and Delete (CRUD) operations, and the data APIs are typically configured according to the underlying data model(s) represented in the databases.

Often, API specification packages related to the APIs are generated manually—which requires a governance process (again, a manual process) to determine whether API developers are following certain standards and guidelines. Some systems rely on software tools to enable the generation of these API specification packages that describe certain attributes and relationships of APIs and to enable the process flow around designing, building, documenting, and consuming APIs in a production environment. In some instances, the API specification package can include one or more files written in a format that provides for a description of the entire API, including items such as available endpoints and operations on each endpoint, operation parameters (e.g., input and output) for each operation, authentication methods, contact information, license, terms of use, and the like. Exemplary software tools include, but are not limited to, Swagger (available from swagger.io) which uses the OpenAPI Specification format. Such API specification packages can be loaded onto computing devices, such as a data abstraction server, in the production computing environment in order to enable functionality that coordinates communication between database server(s) (which store the underlying data structures and data models) and application server (s) (which utilize the data for application tasks).

As can be appreciated however, when the data model(s) are changed or re-configured, the corresponding data APIs and API specification packages must be updated to account for the data model changes. This process typically requires exhaustive analysis of the data model changes as correlated to the API specification packages and to the use by specific applications in the application server environment. Often, such analysis is unable to properly account for items such as internal standards that must be met with respect to API specifications and enumerations that must be kept in sync with the database(s). As a result, the data model changes can result in problems upstream in both the data access layer and the application server layer, including data access errors, loss of data, and/or application functionality failure. In addition, manually created API specifications need to be reviewed, in order to validate if all the standards and guidelines have been followed. If there has been any change in the standards and/or guidelines, all the created API specifications typically need to be modified manually. This approach makes the enforcement of standards and guidelines much more difficult and time-consuming.

SUMMARY

Therefore, what is needed are methods and systems for automatic generation of updated API specification packages that are integrated into a production computing environment so that the latest changes to data models used by data access APIs are synchronized to the data access operations carried out by the APIs. The techniques described herein provide the advantage of utilizing an object-oriented data model of the underlying database(s) as a starting point for the generation of an API specification package, thereby avoiding the time and expense with manual review of data model changes and correlation to API functionality. The methods and systems described herein further provide the benefit of defining template CRUD operations on the databases, including the ability to define details for complex data access operations involving multiple objects in the data model and automatically generate API specifications for such operations. In addition, the methods and systems described herein enable the efficient storage of metadata relating to template and complex data access operations and provide for regeneration of update API specifications after enhancement or rework of the data models. Furthermore, the techniques described herein beneficially enable automatic loading of the generated API specification packages into a data abstraction server computing device that provides for continuity of communications between data servers that store data and make data available, and application software that consumes the data—lessening the frequency of data retrieval or storage errors, or loss of application functionality. Also, the API specifications described herein can follow OpenAPI version 3 guidelines which may be further constrained by certain organizational guidelines—which can evolve over a period of time. Therefore, automating the generation of API specification packages using the techniques described herein ensures that all the API specifications and the subsequent implementation of the API services can be easily refactored for any changes in standards.

The invention, in one aspect, features a system for automatic generation of specifications for data access layer application programming interfaces (APIs). The system includes a server computing device having a memory that stores computer-executable instructions and a processor that executes the computer executable instructions. The server computing device identifies an object-oriented data model based on a logical data model corresponding to a database and a physical data model corresponding to the database. The object-oriented data model comprises (i) a plurality of object structures corresponding to a plurality of physical data structures from the database and containing one or more data elements from the corresponding physical data structures and (ii) one or more relationships between at least two of the object structures corresponding to logical relationships between entities from the logical data model. The server computing device generates an API specification package using the object-oriented data model, including: identifying one or more of the object structures to include in the API specification package; defining one or more attributes for the API specification package; assigning one or more data access operations to each identified object structure, each data access operation including one or more properties for each data access operation; creating one or more data relationships between at least two of the identified object structures, each data relationship defining a data flow direction between the object structures; and converting the identified object structures, the defined attributes for the API specification package, the assigned data access operations, and the created data relationships into one or more files that comprise the API specification package.

The invention, in another aspect, features a computerized method of automatic generation of specifications for data access layer application programming interfaces (APIs). A server computing device identifies an object-oriented data model based on a logical data model corresponding to a database and a physical data model corresponding to the database. The object-oriented data model comprises (i) a plurality of object structures corresponding to a plurality of physical data structures from the database and containing one or more data elements from the corresponding physical data structures and (ii) one or more relationships between at least two of the object structures corresponding to logical relationships between entities from the logical data model. The server computing device generates an API specification using the object-oriented data model, including: identifying one or more of the object structures to include in the API specification package; defining one or more attributes for the API specification package; assigning one or more data access operations to each identified object structure, each data access operation including one or more properties for each data access operation; creating one or more data relationships between at least two of the identified object structures, each data relationship defining a data flow direction between the object structures; and converting the identified object structures, the defined attributes for the API specification package, the assigned data access operations, and the created data relationships into one or more files that comprise the API specification package.

Any of the above aspects can include one or more of the following features. In some embodiments, the server computing device validates the API specification package by analyzing the syntax of the one or more files in the API specification package against a reference syntax. In some embodiments, wherein identifying one or more of the object structures to include in the API specification package comprises receiving, from a client computing device, a selection of one or more object structures and storing the selected object structures as the identified object structures. In some embodiments, the one or more attributes for the API specification package comprise a package name, a package uniform resource locator (URL), a base path, a path host name, a version ID, and a package communication protocol. In some embodiments, the one or more attributes for the API specification package are set based upon input received from a client computing device.

In some embodiments, the one or more data access operations assigned to each identified object structure comprise Create, Read, Update, and Delete (CRUD) operations. In some embodiments, the one or more properties for each data access operation comprise a timeout required, a number of instance to be returned, a pagination needed, a detailed hierarchical object structure needed in request or response, and a path structure. In some embodiments, the data flow direction for the one or more data relationships between at least two of the identified object structures is determined based upon which identified object structure has a defined role name. In some embodiments, each data relationship includes at least one of: a size of the data relationship or a primary key-foreign key designation. In some embodiments, the one or more files that comprise the API specification package include OpenAPI specification files or Swagger specification files. In some embodiments, the server computing device loads the one or more files that comprise the API specification package on a data abstraction server in a production computing environment, the API specification package enabling communication through the data abstraction server between one or more databases of a database server in the production computing environment and one or more software applications of an application server in the production computing environment.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 7 is an exemplary user interface to enable identification of one or more object structures in the object-oriented data model for inclusion in the API specification package.

FIG. 8 is an exemplary user interface to enable assignment of one or more data access operations to each identified object structure in the API specification package.

FIG. 9 is an exemplary user interface to enable creation of data relationships between object structures in the API specification package.

FIG. 10 is an exemplary UI for defining particular attributes of fields within one or more objects in the object-oriented data model for the API specification package.

DETAILED DESCRIPTION

Figure 1:
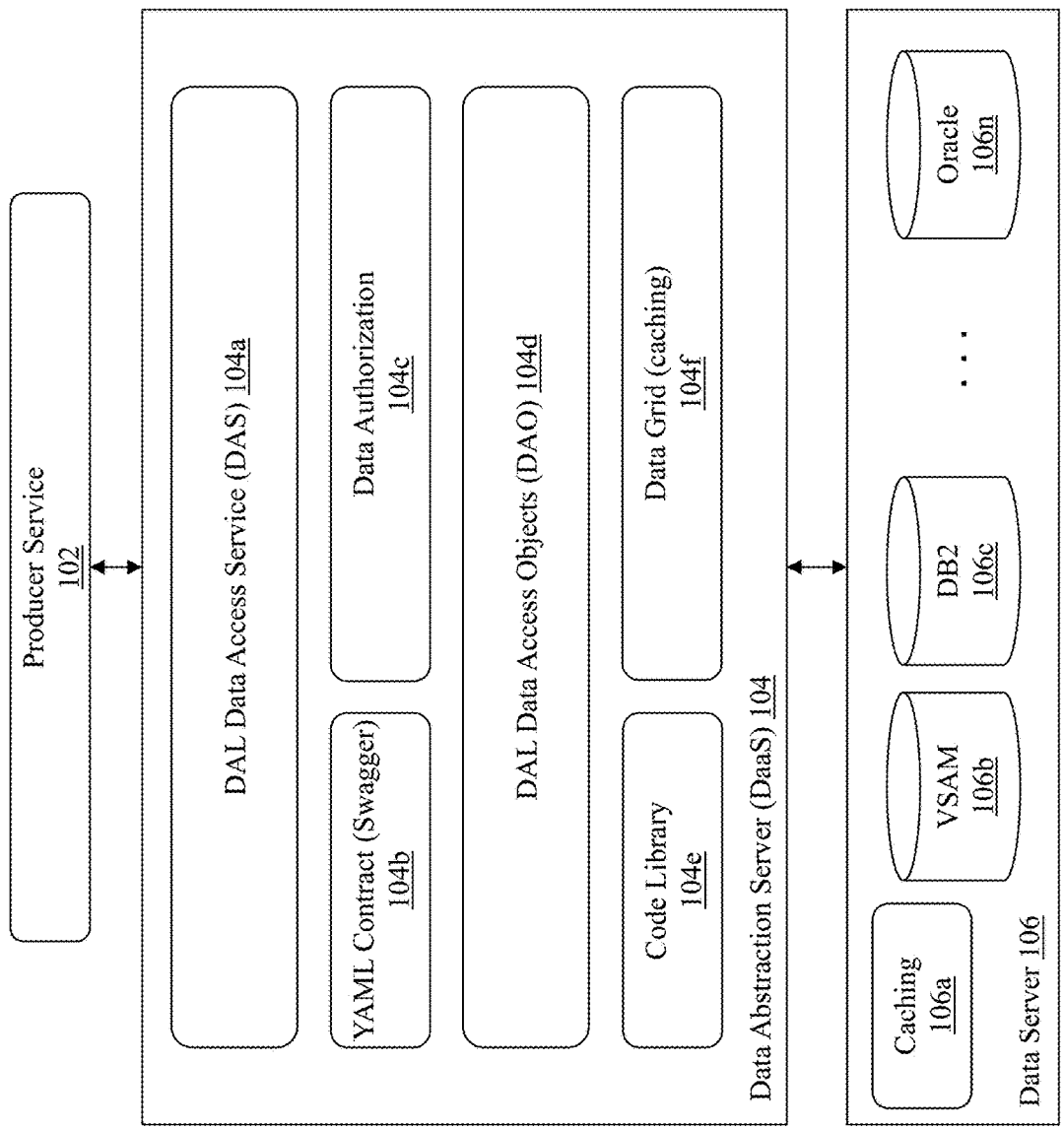
FIG. 1 is a block diagram of an exemplary data access layer (DAL) computing architecture.

FIG. 1 is a block diagram of an exemplary data access layer (DAL) computing architecture 100. As mentioned above, the DAL can comprise one or more computing devices, such as data abstraction server (DaaS) 104 that sits between a producer service 102 (e.g., that provides data to one or more applications running on application servers in a production environment) and a data server 106 (e.g., that houses one or more databases (106b, 106c, 106n) and other types of data storage services (caching 106a)). The data abstraction server 104 can comprise a plurality of services and functionality that enables communication between the producer service 102 and the databases 106b-106n of the data server 106, using a data access service (DAS) 104a, a YAML Contract service 104b, a data authorization layer 104c, a data access objects (DAO) layer 104d, a code library 104e, and a data grid 104f. For example, the DAS 104a is invoked by the producer service 102 via a standard REST interface. The DAS 104a generates request and response messages based upon an API specification package written in YAML (or, in some cases, JSON) using, e.g., OpenAPI or Swagger—as provided by the YAML Contract service 104b. The data authorization layer 104c can invoke an authorization service to determine a data access level (e.g., permissions) for the corresponding request received from the DAS/producer service. The DAO layer 104d maps domain contracts (e.g., API specifications) to physical database(s) and makes calls to the data server 106 (e.g., to access databases 106b-106n). The code library 104e is used by the DAL to support a commons library used by services and functionality on the DaaS 104 (e.g., utility and other helper classes). The data grid 104f can support caching and persistence of data objects retrieved from the data server 106 and used by the production service 102 via, e.g., a data caching solution—an exemplary data caching solution is the Aerospike™ NoSQL data platform available from Aerospike, Inc. or other similar types of data caching platforms. The data server 106 comprises a caching service 106a and a plurality of physical databases (e.g., VSAM 106b, DB2 106c, Oracle 106n, among others). The data server 106 can communicate with the DaaS 104 using, e.g., JDBC or client code.

Figure 5:
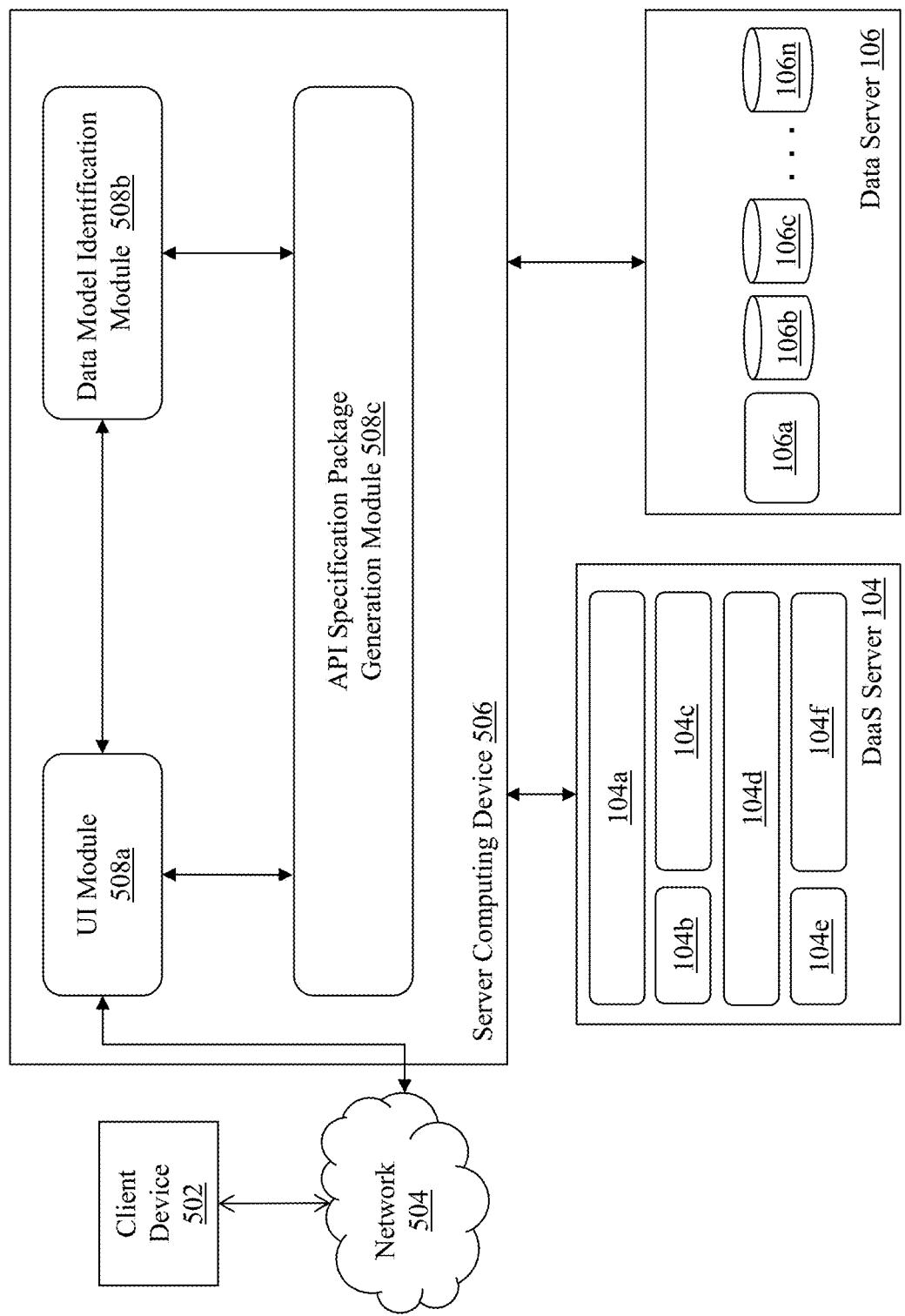
FIG. 5 is a block diagram of a system for automatic generation of specifications for data access layer application programming interfaces (APIs)

As mentioned above, the YAML Contract service 104b comprises one or more files that make up one or more API specification packages used by the DaaS 104 to enable data access operations and other communications between the producer service 102 and the data server 106. In one example, the data access operations supported by the API specification packages can include Create, Read, Update, and Delete (CRUD) operations. The system 500 of FIG. 5 is used to generate the API specification package files, as will be explained in greater detail below.

In order to generate the API specification package files, the system 500 can utilize an object data model generated from one or more of the databases 106b-106n of data server 106. In one embodiment, the object data model can be generated using a data modeling and visualization software tool such as PowerDesigner™, available from SAP, Inc. or other types of data modeling and visualization software packages.

Figure 2:
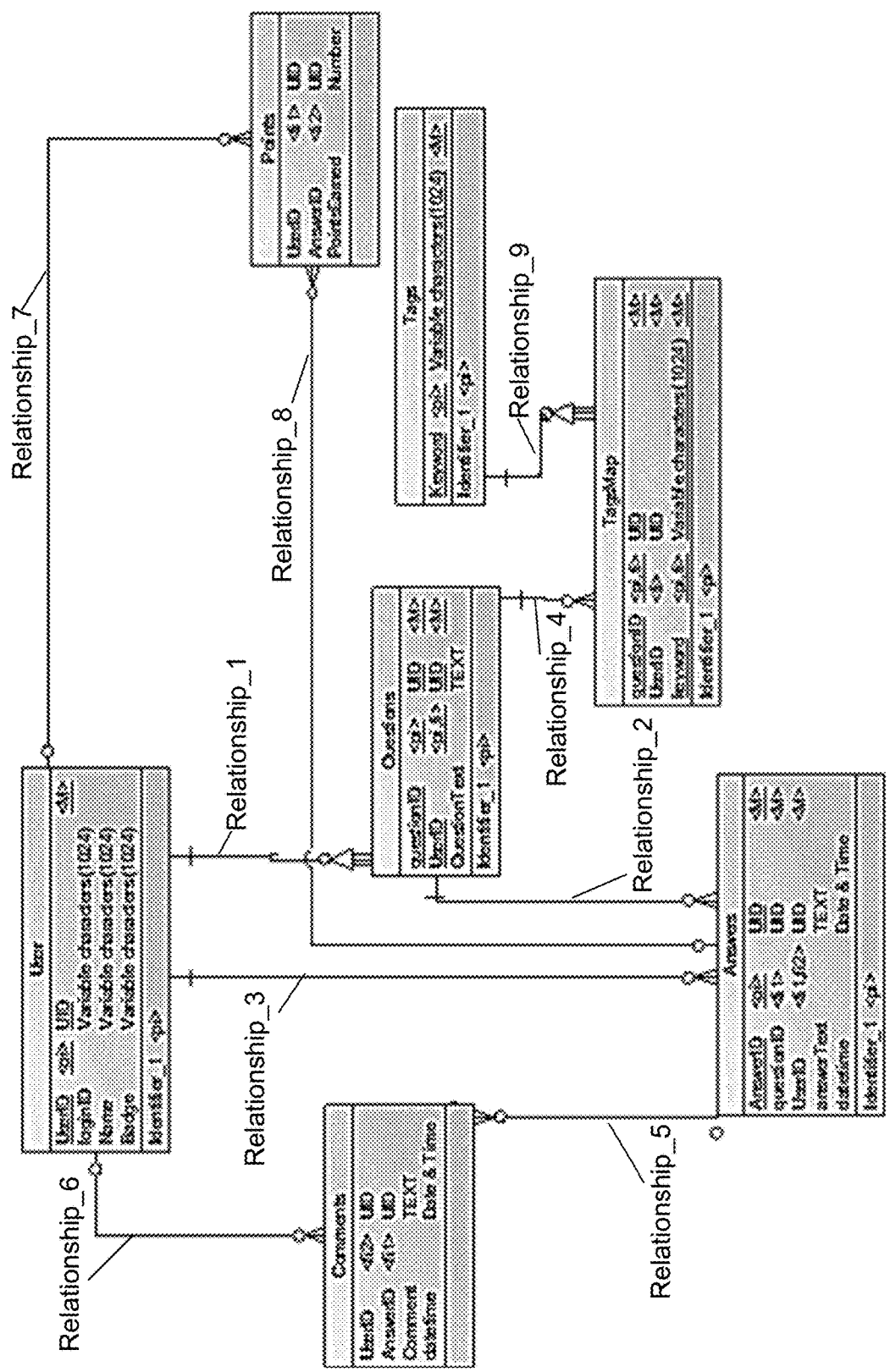
FIG. 2 is a diagram of an exemplary logical data model.

As can be appreciated, there are several different ways that database entities (e.g., database tables, relationships) can be modeled. FIG. 2 is an exemplary logical data model 200 of an example database. As shown in FIG. 2, the logical data model 200 comprises a plurality of database tables (e.g., User, Points, Questions, Comments, Answers, TagsMap, and Tags), where certain data fields in each of the tables have relationships to data fields in other tables. Typically, a logical data model defines certain application- or business-related entities and relationships between the entities.

Figure 3:
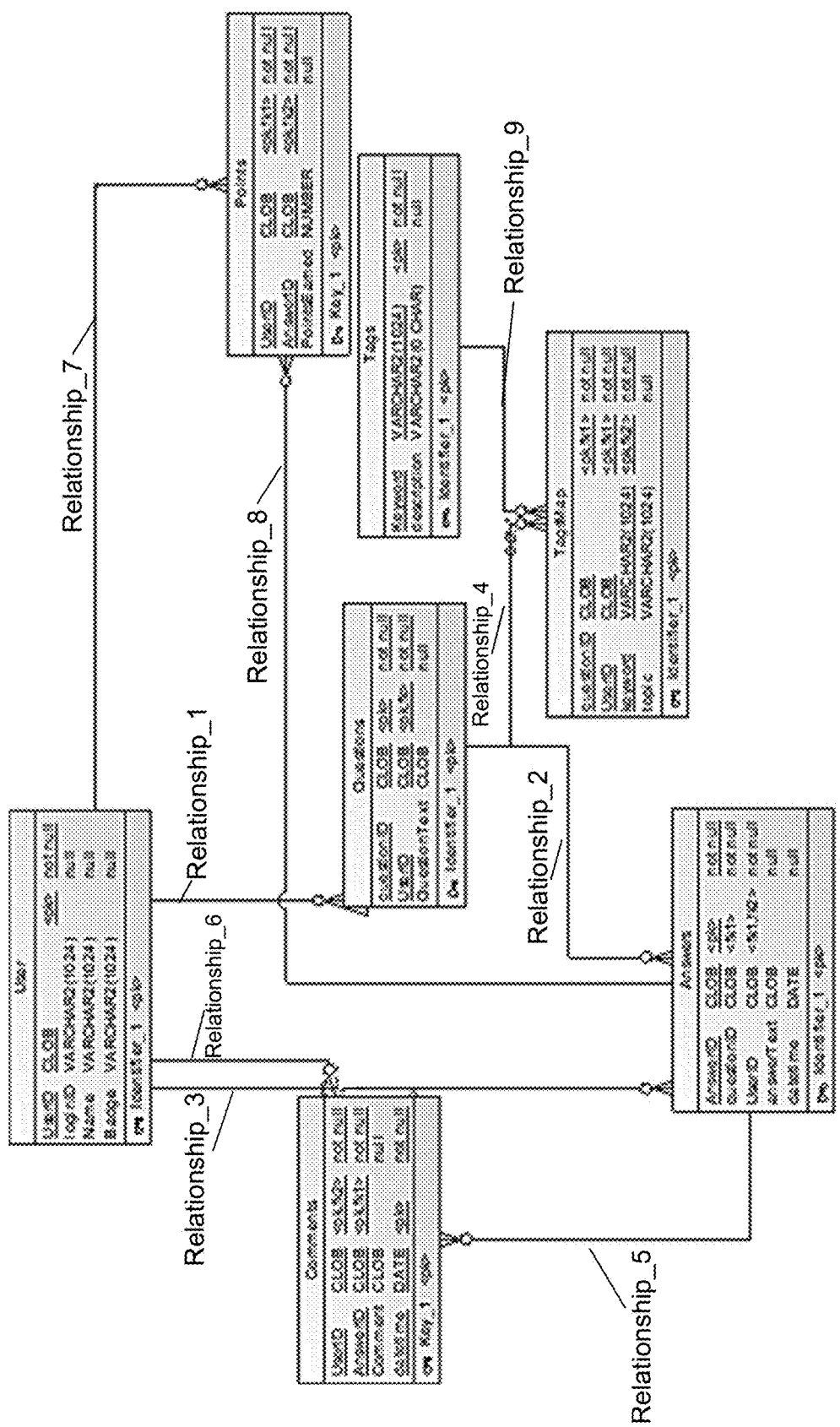
FIG. 3 is a diagram of an exemplary physical data model.

Another type of data model is a physical data model. FIG. 3 is an exemplary physical data model 300 of the same example database shown in FIG. 2. As shown in FIG. 3, the physical data model 300 defines data structures and metadata specific to the technology used to implement the data storage—such as defining data types (e.g., CLOB, DATE, VARCHAR), primary keys/foreign keys, and the like. The physical data model 300 further stores the actual data used by the other systems described herein. It should be appreciated that the data structures and metadata used may vary from database to database, based upon the technology used to implement the particular database.

Figure 4:
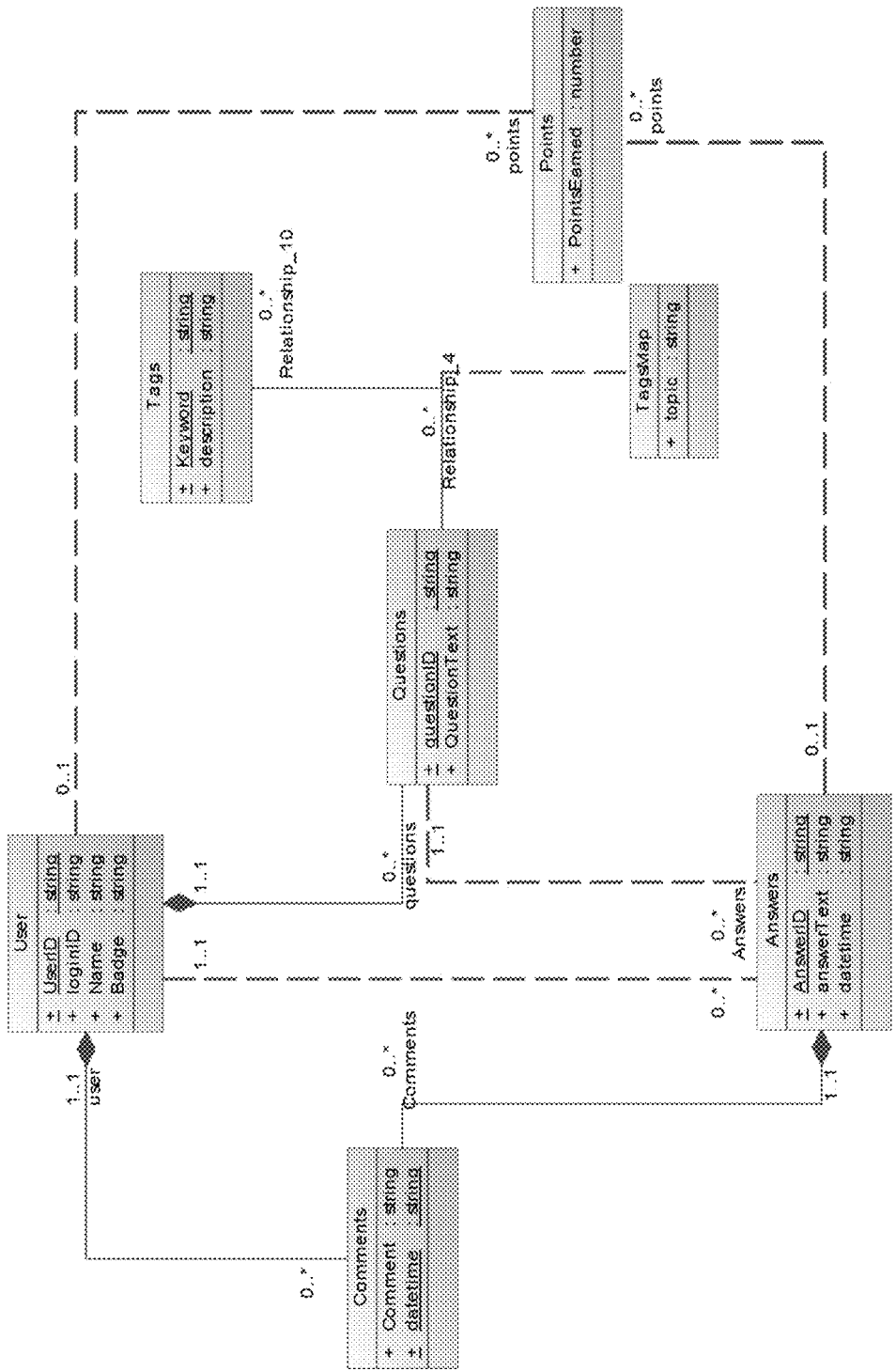
FIG. 4 is a diagram of an exemplary object data model.

Yet another type of data model is an object data model. FIG. 4 is an exemplary object data model 400 of the same example database shown in FIGS. 2 and 3. As shown in FIG. 4, the object data model 400 defines application- or business-related entities in terms of object structures (in most cases, aligning closely with the logical data model 200). However, an object data model 400 is populated with data that is stored in the physical data model 300—hence, the object data model is related to the physical data model as well. In addition, an object data model 400 also supports operations on the objects (such as simple CRUD operations on one object/entity, or complex operations involving multiple objects/entities). The object data model further can be defined with an identifier (e.g., QA-DAL) used to generate the API specification package, as provided below.

Any of the above types of data models can be generated through the use of a data modeling and visualization software tool such as PowerDesigner™, available from SAP, Inc. or other types of data modeling and visualization software packages. As provided herein, the system 500 of FIG. 5 utilizes the object data model in order to generate the API specification package files—however, it should be appreciated that other types of data model(s) could be used to generate the API specification package files without departing from the scope of invention.

FIG. 5 is a block diagram of a system 500 for automatic generation of specifications for data access layer application programming interfaces (APIs). The system 500 includes one or more client computing devices (e.g., client device 502) that is coupled via communications network 504 to the server computing device 506. The server computing device 506 includes a user interface (UI) module 508a, a data model identification module 508b, and an API specification package generation module 508c. The server computing device 106 is coupled to the DaaS server 104 and the data server 106 (as described above with respect to FIG. 1).

The client computing device 502 connects to the communications network 504 in order to communicate with the server computing device 506 to provide input and receive output relating to the process of automatic generation of specifications for data access layer APIs as described herein. The client computing device 502 is coupled to a display device (not shown). For example, the client computing device 502 can provide a detailed graphical user interface (GUI) via the display device that presents output resulting from the methods and systems described herein, where the GUI is utilized by an operator to review data associated with the process of automatic generation of specifications for data access layer APIs.

Exemplary client devices 502 include but are not limited to desktop computers, laptop computers, tablets, mobile devices, smartphones, and internet appliances. It should be appreciated that other types of computing devices that are capable of connecting to the components of the system 500 can be used without departing from the scope of invention. Although FIG. 5 depicts a single client device 502, it should be appreciated that the system 500 can include any number of client devices.

The communication network 504 enables the other components of the system 500 to communicate with each other in order to perform the process of automatic generation of specifications for data access layer APIs as described herein. The network 504 may be a local network, such as a LAN, or a wide area network, such as the Internet and/or a cellular network. In some embodiments, the network 504 is comprised of several discrete networks and/or sub-networks (e.g., cellular to Internet) that enable the components of the system 500 to communicate with each other.

The server computing device 506 is a combination of hardware, including one or more special-purpose processors and one or more physical memory modules, and specialized software modules—such as UI module 508a, data model identification module 508b, and API specification package generation module 508c—that execute on the processor of the server computing device 506, to receive data from other components of the system 500, transmit data to other components of the system 500, and perform functions for automatic generation of specifications for data access layer APIs as described herein.

In some embodiments, the modules 508a-508c are specialized sets of computer software instructions programmed onto a dedicated processor in the server computing device 506 and can include specifically-designated memory locations and/or registers for executing the specialized computer software instructions. Further explanation of the specific processing performed by the modules 508a-508c will be provided below.

Figure 6:
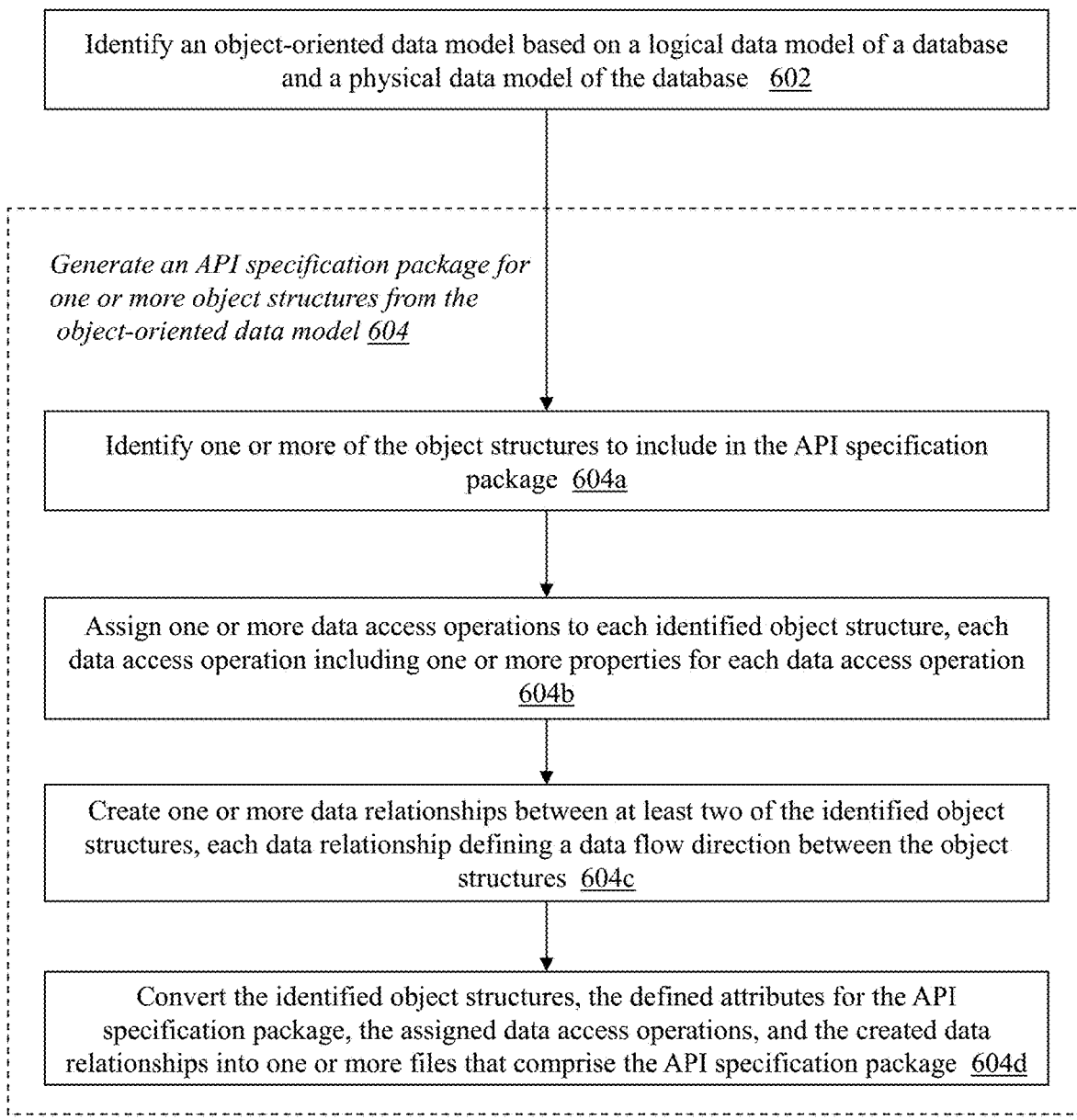
FIG. 6 is a flow diagram of a computerized method of automatic generation of specifications for data access layer application programming interfaces (APIs).

FIG. 6 is a flow diagram of a computerized method 600 of automatic generation of specifications for data access layer APIs, using the system 500 of FIG. 5. The data model identification module 508b of server computing device 106 identifies (202) an object data model based on a logical data model of a database (e.g., database(s) 106b-106n) and a physical data model of the database. For example, as changes are made to the underlying data model(s) present in one or more of the databases 106b-106n, the data model identification module 508b can be configured to identify one or more object-oriented data models generated by the SAP PowerDesigner tool based upon the newly-changed database (s). In one example, the data model identification module 508a can select an object-oriented data model based upon, e.g., a timestamp indicating that the data model was recently changed or generated. Once the data model identification module 508b has identified a particular object-oriented data model, the module 508b can retrieve the data model for processing by the API specification package generation module 508c.

The API specification package generation module 508c generates (604) an API specification package for one or more object structures in the object-oriented data model. The generation process comprises four steps: identification (604a) of one or more of the object structures to include in the API specification package; assignment (604b) of one or more data access operations to each identified object structure, where each data access operation includes one or more properties for each data access operation; creation (604c) of one or more data relationships between at least two of the identified object structures, where each data relationship defines a data flow direction between the object structures 604c; and conversion (604d) of the identified object structures, the defined attributes for the API specification package, the assigned data access operations, and the created data relationships into one or more files that comprise the API specification package. More detail about the operation of each of the steps 604a-604d is provided below.

Figure 7:
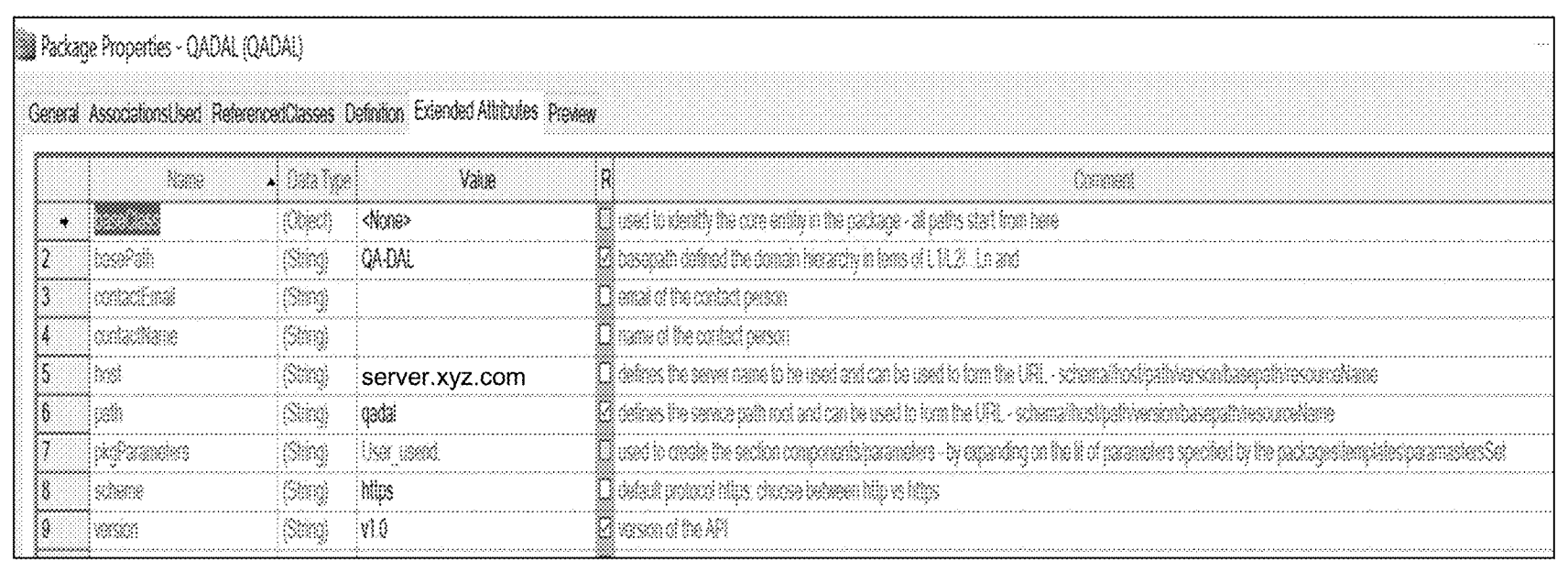

First, the API specification package generation module 508c identifies (604a) one or more of the object structures to include in the API specification package. In some embodiments, the identification of the object structures is provided via the client computing device 502 using, e.g., specialized software provided by the UI module 508a in conjunction with the API specification package generation module 508c to select one or more object structures to be included in the API specification package. FIG. 7 is an exemplary user interface generated by the UI module 508a for display on the client computing device 502 to enable identification of one or more object structures in the object-oriented data model for inclusion in the API specification package.

As shown in FIG. 7, the UI includes elements that enable a user of client computing device 102 to specify the objects from the object-oriented data model to be included in the API specification package. This UI also creates the package files. The UI includes selectable interface options for a variety of attributes of the API specification package, including:

baseClass—core object(s)/entit(ies) in the API specification package—the object data model identifier (e.g., QA-DAL in FIG. 4) can be provided here to identify the object-oriented data model;
basePath—base path in the domain hierarchy;
contactEmail—email address of contact person responsible for API;
contactName—name of contact person responsible for API;
host—server name/URL to be used;
path—service path root;
pkgParameters—used to create the section components/parameters;
scheme—default protocol, http or https;
version—version of the API defined in the package.

Once the attributes for the API specification package are selected, the UI module 508a in conjunction with the API specification package generation module 508c can generate a UI for display on the client computing device 102 to enable assigning (604b) one or more data access operations to each identified object structure, where each data access operation including one or more properties for each data access operation. It should be appreciated that the UIs described in FIGS. 8-10 comprise data and/or metadata that the modules 508a and 508c can automatically retrieve from the identified object-oriented data model and populate in the UI. As such, the system 500 advantageously provides for automatic initialization and configuration of the process workflow for generating API specification package files using the most current data model—that reflects changes made to the data model, without requiring exhaustive analysis of such changes and manual configuration of API specifications to sync with the data model changes.

FIG. 8 is an exemplary user interface generated by the UI module 508a for display on the client computing device 502 to enable assignment of one or more data access operations to each identified object structure. As shown in FIG. 8, the UI includes elements that enable a user of client computing device 102 to assign data access operations (e.g., CRUD operations) to each structure in the object-oriented data model. For example, using the data model of FIG. 4, each row in the UI corresponds to an object (e.g., table) in the data model (as shown in FIG. 4, the tables are Answers, Comments, Points, Questions, Tags, TagsMap, and User). For each entity, the user can associate the objects with one or more required data access operations (as seen in the right-hand column of the UI). Also, based upon the data access operations that are chosen, the UI provides for the entry or selection of values for specific properties of each operation, including:

isTimeOutRequired—indicates whether the API should time out if a predetermined amount of time is reached after initiating the data access operation (potentially indicating an error executing the operation);

NumOfInstances—indicates a number of instances of the corresponding object to be returned by the API;

isPaginationNeeded—indicates whether retrieval of data from the database using the API will require partitioning of the data set into pages (e.g., for large data sets);

detailedStructureNeeded—indicates whether the detailed hierarchical object structure is required to be provided as part of the data access operation;

pathStructure—path structure for the data access operation can be added, including path parameters or flags.

In some embodiments, the data access operations assigned to particular entities can be simple CRUD operations on a single entity and/or complex operations involving multiple entities in the object data model.

After the data access operations are configured using the UI of FIG. 8, the API specification package generation module 508c in conjunction with the UI module 508a can generate a UI to enable creating (604c) one or more data relationships between at least two of the identified object structures, where each data relationship defines a data flow direction between the object structures. FIG. 9 is an exemplary user interface generated by the UI module 508a for display on the client computing device 502 to enable creation of data relationships.

As shown in FIG. 9, the UI includes elements that enable a user of client computing device 102 to create data relationships between different object structures in the object data model. For example, the first row of the UI comprises a definition of a data relationship between the User object (Class A) and the Questions object (Class B). Each relationship can be associated with a role, which indicates a data flow direction between the object structures. For example, the relationship between User and Questions (as shown in the first row of the UI) has the Questions entity defined in the Role B field—indicating that data flows from the User entity to the Questions entity. Comparing this to the data object model in FIG. 4, we see that a row in the User table (i.e., one UserID) can be related to many rows in the Questions table (as indicated by the 0..* reference character on the line connecting User to Questions). The physical data model in FIG. 3 further supports this definition of the relationship between User and Questions—the line connecting the two entities has a circle and multi-pronged line symbol at the Questions table, indicating a one-to-many relationship. Generally, the relationship is further defined to include a size (e.g., 1 or 0)—although where the relationship is 'n' (one-to-many) the UI includes a field to specify the relationship size. For example, as shown in the first row of the UI, the Role B size for the relationship between User and Questions is set to 20—meaning that one User data row can be related to a maximum of 20 Question data rows.

FIG. 10 is an exemplary UI generated by the UI module 508a in conjunction with the API specification package generation module 508c for defining particular attributes of fields within one or more objects in the object-oriented data model. As shown in FIG. 10, the UI comprises a table with a plurality of rows, where each row corresponds to a data field in a specific object. The checkboxes to the right of each data field name indicate attributes of the field that are operative to affect the functionality of the API data access operations. For example, the checkboxes can indicate whether the data field is included in response or create structures; is used for search filter or range filters; is used for update request; or should carry enumerations derived from the database. This UI can be displayed on client computing device after the UI of FIG. 9.

Figure 11:
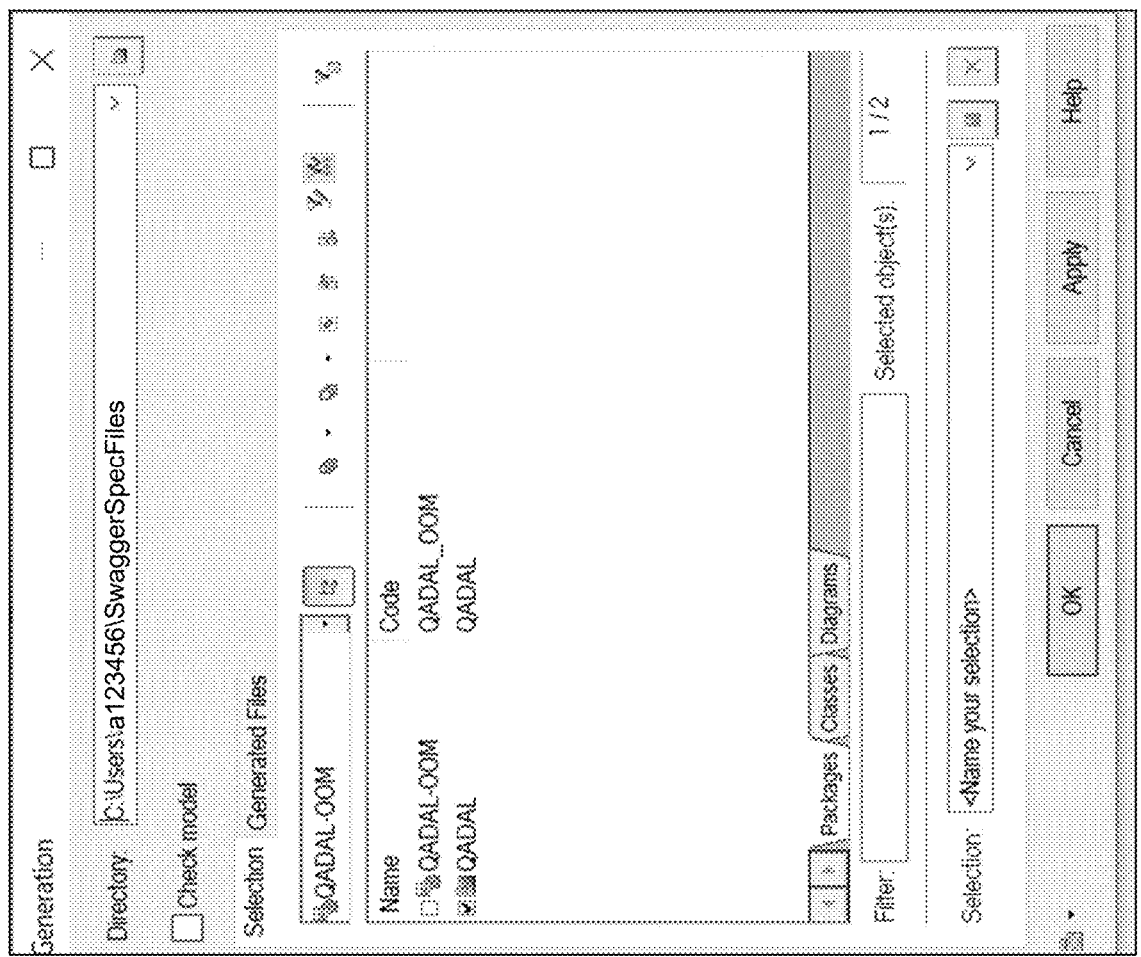
FIG. 11 is an exemplary user interface to enable conversion of the data defined in FIGS. 7-10 into one or more files that comprise the API specification package.

After the relationships are defined and any attributes of the data fields are selected, the API specification package generation module 508c in conjunction with the UI module 508a can generate a UI to enable converting (604d) the identified object structures, the defined attributes for the API specification package, the assigned data access operations, and the created data relationships into one or more files that comprise the API specification package. FIG. 11 is an exemplary user interface generated by the UI module 508a for display on the client computing device 502 to enable conversion of the data defined in FIGS. 7-10 into one or more files that comprise the API specification package.

As shown in FIG. 11, the UI includes selection of a directory in which the API specification files are placed (as indicated by the directory string in the Directory input box at the top of the UI). For example, this string can point to a location utilized by the YAML Contract service 104b of the DaaS 104, so that the DaaS 104 can access the generated API specification package files for integration into the production computing environment. The UI further includes a selection checkbox associated with one or more object-oriented data model packages (e.g., QADAL) that can be clicked to indicate for which object data models the corresponding API specification package(s) should be generated. Once the selections are made, the API specification package generation module 508c generates the one or more files comprising the API specification package and stores them in the corresponding directory.

In some embodiments, the API specification package generation module 508c uses an open-source software tool, such as Swagger available from OpenAPI (swagger.io), to generate the API specification package files from the data defined in the UI as described above. Generally, the files can be created using any number of different formats or languages, although the most common are YAML or JSON. It should be appreciated that other software tools can be used to generate the API specification documents and files without departing from the scope of invention.

The above-described techniques can be implemented in digital electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a PSoC (Programmable System-on-Chip), ASIP (application-specific instruction-set processor), or an ASIC (application-specific integrated circuit), or the like.

Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automatic generation of specifications for data access layer application programming interfaces (APIs), the system comprising a server computing device having a memory that stores computer-executable instructions and a processor that executes the computer executable instructions to:

identify an object-oriented data model based on a logical data model corresponding to a database and a physical data model corresponding to the database, the object-oriented data model comprising (i) a plurality of object structures corresponding to a plurality of physical data structures from the database and containing one or more data elements from the corresponding physical data structures and (ii) one or more relationships between at least two of the object structures corresponding to logical relationships between entities from the logical data model; and generate an API specification package using the object-oriented data model, comprising:
identifying one or more of the object structures to include in the API specification package;
defining one or more attributes for the API specification package;
assigning one or more data access operations to each identified object structure, each data access operation including one or more properties for each data access operation;
creating one or more data relationships between at least two of the identified object structures, each data relationship defining a data flow direction between the object structures; and
converting the identified object structures, the defined attributes for the API specification package, the assigned data access operations, and the created data relationships into one or more files that comprise the API specification package.

2. The system of claim 1, wherein the server computing device validates the API specification package by analyzing the syntax of the one or more files in the API specification package against a reference syntax.

3. The system of claim 1, wherein identifying one or more of the object structures to include in the API specification package comprises receiving, from a client computing device, a selection of one or more object structures and storing the selected object structures as the identified object structures.

4. The system of claim 1, wherein the one or more attributes for the API specification package comprise a package name, a package uniform resource locator (URL), a base path, a path host name, a version ID, and a package communication protocol.

5. The system of claim 4, wherein the one or more attributes for the API specification package are set based upon input received from a client computing device.

6. The system of claim 1, wherein the one or more data access operations assigned to each identified object structure comprise Create, Read, Update, and Delete (CRUD) operations.

7. The system of claim 6, wherein the one or more properties for each data access operation comprise a timeout required, a number of instance to be returned, a pagination needed, a detailed hierarchical object structure needed in request or response, and a path structure.

8. The system of claim 1, wherein the data flow direction for the one or more data relationships between at least two of the identified object structures is determined based upon which identified object structure has a defined role name.

9. The system of claim 1, wherein each data relationship includes at least one of: a size of the data relationship or a primary key-foreign key designation.

10. The system of claim 1, wherein the one or more files that comprise the API specification package include OpenAPI specification files or Swagger specification files.

11. The system of claim 1, wherein the server computing device loads the one or more files that comprise the API specification package on a data abstraction server in a production computing environment, the API specification package enabling communication through the data abstraction server between one or more databases of a database server in the production computing environment and one or more software applications of an application server in the production computing environment.

12. A computerized method of automatic generation of specifications for data access layer application programming interfaces (APIs), the method comprising:
identifying, by a server computing device, an object-oriented data model based on a logical data model corresponding to a database and a physical data model corresponding to the database, the object-oriented data model comprising (i) a plurality of object structures corresponding to a plurality of physical data structures from the database and containing one or more data elements from the corresponding physical data structures and (ii) one or more relationships between at least two of the object structures corresponding to logical relationships between entities from the logical data model; and
generating, by the server computing device, an API specification package using the object-oriented data model, comprising:
identifying one or more of the object structures to include in the API specification package;
defining one or more attributes for the API specification package;
assigning one or more data access operations to each identified object structure, each data access operation including one or more properties for each data access operation;
creating one or more data relationships between at least two of the identified object structures, each data relationship defining a data flow direction between the object structures; and
converting the identified object structures, the defined attributes for the API specification package, the assigned data access operations, and the created data relationships into one or more files that comprise the API specification package.

13. The method of claim 12, wherein the server computing device validates the API specification package by analyzing the syntax of the one or more files in the API specification package against a reference syntax.

14. The method of claim 12, wherein identifying one or more of the object structures to include in the API specification package comprises receiving, by the server computing device from a client computing device, a selection of one or more object structures and storing the selected object structures as the identified object structures.

15. The method of claim 12, wherein the one or more attributes for the API specification package comprise a package name, a package uniform resource locator (URL), a base path, a path host name, a version ID, and a package communication protocol.

16. The method of claim 15, wherein the one or more attributes for the API specification package are set based upon input received from a client computing device.

17. The method of claim 12, wherein the one or more data access operations assigned to each identified object structure comprise Create, Read, Update, and Delete (CRUD) operations.

18. The method of claim 17, wherein the one or more properties for each data access operation comprise a timeout required, a number of instance to be returned, a pagination needed, a detailed hierarchical object structure needed in request or response, and a path structure.

19. The method of claim 12, wherein the data flow direction for the one or more data relationships between at least two of the identified object structures is determined based upon which identified object structure has a defined role name.

20. The method of claim 12, wherein each data relationship includes at least one of: a size of the data relationship or a primary key-foreign key designation.

21. The method of claim 12, wherein the one or more files that comprise the API specification package include OpenAPI specification files or Swagger specification files.

22. The method of claim 12, further comprising loading, by the server computing device, the one or more files that comprise the API specification package on a data abstraction server in a production computing environment, the API specification package enabling communication through the data abstraction server between one or more databases of a database server in the production computing environment and one or more software applications of an application server in the production computing environment.

* * * * *